Patented Nov. 2, 1926. 1,605,376

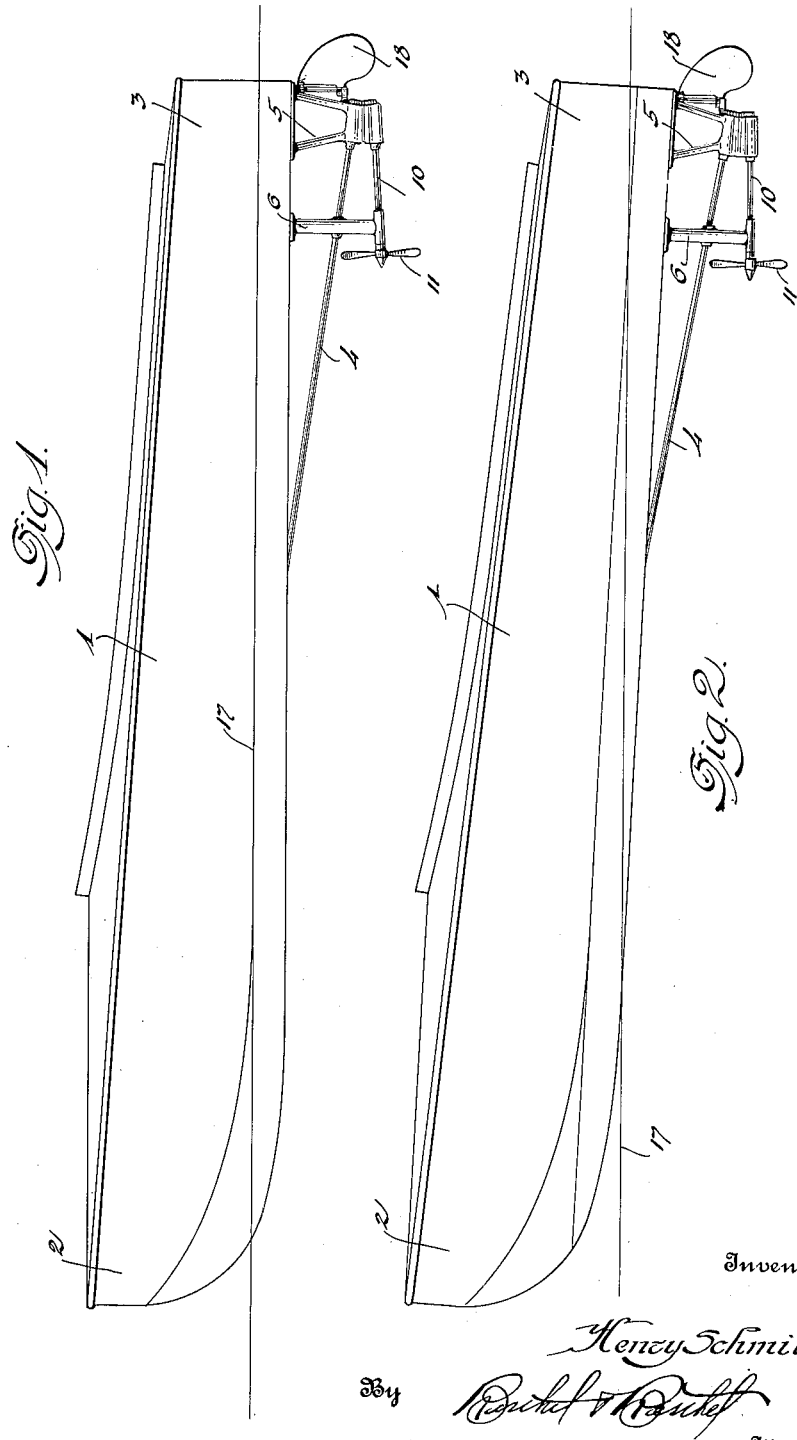

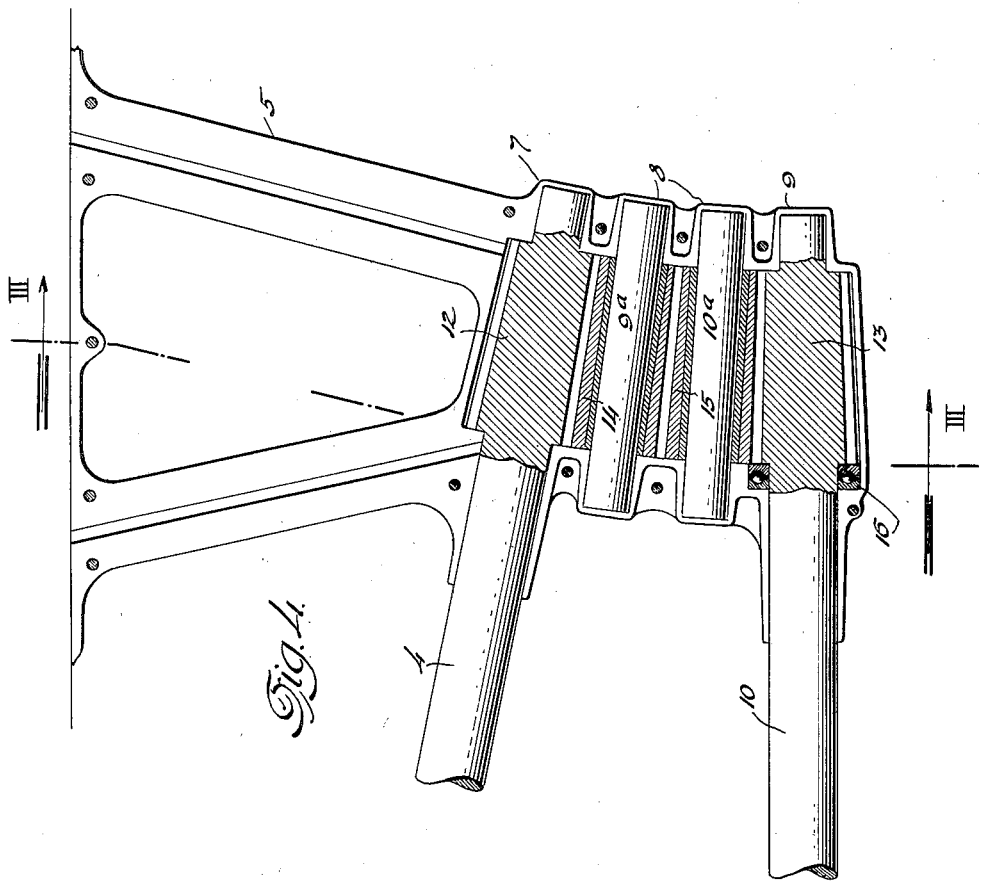
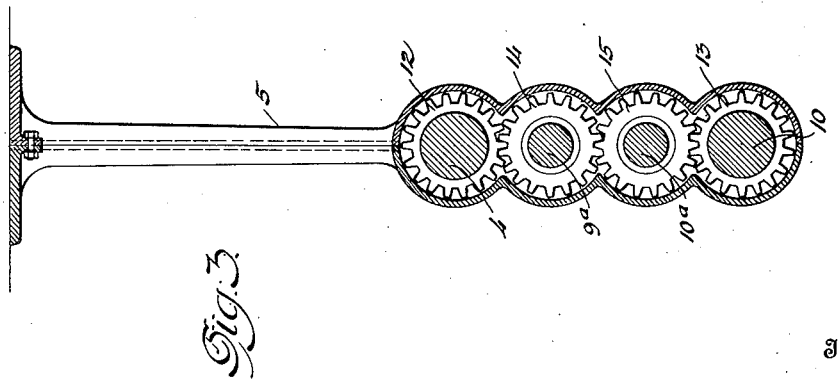

UNITED STATES PATENT OFFICE.

HENRY SCHMITT, OF DETROIT, MICHIGAN.

MOTOR BOAT.

Application filed December 1, 1924. Serial No. 753,101.

This invention relates to motor boats and has special reference to that class of boats having built-in power plants, in contradistinction to outboard motors, and propellers under the hulls of the boats. In the operation of this class of motor boats, particularly those designed for speed, the development of power causes the bow of the boat to raise and the stern to sink, with the result that any propeller at the stern of the boat has the vertical plane thereof changed relative to the horizontal or the line of travel. For instance, an inactive motor boat on a body of water ordinarily has the bottom of its hull in a plane parallel to the surface of the water and the propeller shaft is ordinarily supported parallel to the hull. When such a motor boat is placed in operation the hull immediately assumes an angle relative to the surface of the water and this means that the propeller shaft is tilted upward placing the plane of the propeller at an angle to the horizontal or surface of the water. In such position the propeller is at a disadvantage for the development of speed, because it is attempting to drive at an angle to the line of travel and furthermore is operating in a turbulent body of water on account of the pitch of the boat hull.

My invention aims to locate a propeller where it will be most effective for the development of speed without encountering turbulent waters. With this end in view I support a propeller so that when a motor boat is placed in operation the plane of the propeller will be approximately at a right angle to the line of travel and will be in a body of water not materially affected by the speed of the motor boat.

My invention further aims to provide a journal box for diverging shafts, one of which is driven to drive the other and the latter provided with a propeller in advance of the journal box. As a matter of convenience and economical construction the journal box may be utilized as a support for a rudder post.

Other advantages are gained by my propeller shaft arrangement and reference will now be had to the drawings wherein Figure 1 is a side elevation of a conventional form of motor boat at rest on a body of water;

Fig. 2 is a similar view showing the motor boat in operation and the inclination is assumed relative to the surface of the water;

Fig. 3 is an enlarged vertical cross sectional view of a combined hanger and journal box, and Fig. 4 is a longitudinal sectional view of the same.

In the drawings, the reference numeral 1 denotes a conventional form of motor boat having a bow 2 and a stern 3. Suitably located within the boat is a power plant adapted for driving a shaft 4 extending rearwardly at an angle from the bottom or hull of the boat and the outer end of said shaft is journaled in two hangers 5 and 6, the latter being in advance of the former and adapted for braking the drive shaft 4 relative to the boat.

The hanger 5 is of novel construction by including a multiple journal box or housing having bearings 7 for the outer end of the shaft 4, bearings 8 for power transmission shafts $9^a$ and $10^a$, and bearings 9 for a propeller shaft 10, said propeller shaft being journaled in the lower end of the bracing hanger 6 and provided with a conventional form of propeller 11 in front of said hanger.

The end of the drive shaft 4, within the journal box or housing is provided with a conical gear wheel 12 and the end of the propeller shaft 10 within the journal box or housing has a gear wheel 13 which is driven from the gear wheel 12 by gear wheels 14 and 15 on the shafts $9^a$ and $10^a$ respectively. The gear wheels 12 to 15 inclusive form a train or power transmission mechanism by which power is transmitted from the drive shaft 4 to the driven or propeller shaft 10, and said train of gear wheels may be considered the equivalent of sprocket wheels and a chain or any other form of power transmission device.

At suitable and proper places within the journal box or housing may be placed antifrictional thrust bearings 16 and said journal box or housing may be made of two or more parts to facilitate the power transmission mechanism.

By reference to Figs. 1 and 2 it will be noted that the boat 1 at rest, has a water line 17 and that the shafts 4 and 10 are at an angle relative to such line and are diverging in the hangers 5 and 6 with the propeller shaft 10 extending forwardly and downwardly at an angle to the horiontal, which is the water line 17. When the boat is placed in operation the bow 2 is raised and the stern 3 lowered, thereby causing the propeller shaft 10 to approach the horizontal and become substantially parallel to the normal water line or direction of travel of the boat. In consequence of this automatic positioning of the propeller, with its plane of rotation substantially at a right angle to the line of travel, the propeller can drive the boat in the direction of travel, in contradistinction to driving the boat upward and as though out of the water, which an ordinary propeller tends to do on account of having its plane of rotation at an angle to the line of travel when a boat is driven through the water at considerable speed. Ordinarily the propeller is operating in a turbulent and rough body of water and at an angle to the direction of travel. With my propeller arrangement the propeller is in a deeper body of water and since it tends to drive the boat straight ahead, in a natural line of travel on the surface of water there is less water agitation by the boat hull and consequently quieter water for the propeller to operate in. There being less resistance on account of the boat moving in a natural direction it is apparent that there will be less churning of the water by the propeller and consequently quieter water about the boat, which is desirable for many reasons and especially when speed boats are competing in a race.

On account of the hangers being located under the boat hull, at the stern 3, the hanger 5 may be conveniently used for supporting the post of a rudder 18 irrespective of the type of stern on the boat.

I attach considerable importance to the fact that the angularity of the propeller shaft 10 accomplishes driving advantages in connection with a speed boat and other types of motor boats. Since some motor boats have the power plants in the stern it is obvious that there may be a different arrangement of the power transmission mechanism than that herein shown and described. For instance, the drive shaft may be substantially vertical relative to the strain, either in or out of the hull, but in all instances it is essential that the propeller shaft 10 be disposed at an angle in order to accomplish the results of my invention. In view of this my invention is susceptible to such changes as are permissible by the appended claims.

What I claim is:—

1. The combination of a motor boat, a hanger at the stern of said boat; diverging shafts supported by said hanger, one of said shafts being driven to drive the other and a propeller on the last mentioned shaft.

2. The combination called for in claim 1, and a journal box carried by said hanger and resisting any thrust of said shafts.

3. The combination of a motor boat, a hanger at the stern of said boat affording support for a rudder, diverging shafts journaled in said hanger, one of said shafts being engine driven, a propeller on the other shaft, and power transmission means between said shafts.

4. The combination called for in claim 3, and a shaft bracing hanger in advance of the stern hanger.

5. The combination of a motor boat, a hanger at the stern of said boat, a propeller shaft journaled in said hanger, and extending forwardly at an angle to the line of travel, means supported by said hanger and extending into said boat for driving said propeller shaft, and a rudder supported by said hanger.

6. The combination called for in claim 3, wherein said power transmission means includes a train of gears housed in said hanger.

7. In a motor boat wherein the development of power at a stern propeller causes the bow of the boat to raise and change the normal position of the propeller relative to the line of travel;—means for maintaining the plane of a propeller substantially at a right angle to the line of travel, said means comprising a driven propeller shaft under the boat hull set at an angle to the horizontal and adapted to approach the horizontal as the bow of the boat is raised because of the speed of the boat.

In testimony whereof I affix my signature.

HENRY SCHMITT.